United States Patent [19]

DuBosque, Jr.

[11] 4,426,998
[45] Jan. 24, 1984

[54] SOLAR COLLECTOR UNIT FOR ROOF OR WALL MOUNTING

[75] Inventor: Clayton DuBosque, Jr., New Canaan, Conn.

[73] Assignee: Thermatool Corp., Samford, Conn.

[21] Appl. No.: 362,914

[22] Filed: Mar. 29, 1982

[51] Int. Cl.³ .................................................. F24J 3/02
[52] U.S. Cl. ...................................... 126/448; 126/447
[58] Field of Search ............... 126/445, 446, 447, 448, 126/450, 432, 442, 417; 165/171-174

[56] References Cited

U.S. PATENT DOCUMENTS 4,136,272 1/1979 Rudd ..................................... 126/446
4,269,172 5/1981 Parker et al. ......................... 126/450

FOREIGN PATENT DOCUMENTS 3017598 11/1981 Fed. Rep. of Germany ...... 126/447
55-92844 7/1980 Japan .................................... 126/450

Primary Examiner—James C. Yeung
Attorney, Agent, or Firm—Brooks, Haidt, Haffner & Delahunty

[57] ABSTRACT

A solar collector unit adapted to be installed between the studs or rafters of a building, the unit comprising one or more strips of thin metal welded to three parallel tubes, the intermediate tube having a bore larger than the bores of the two other tubes and the tubes being connected to headers so that fluid flowing in the two tubes flows through the intermediate tube and so that connections of a fluid source to the tubes is made at one end of the unit. The headers carry brackets by which the unit may be secured to, and supported by, the studs or rafters. The sunlight receiving side of the unit is covered by glazing secured to the building and the opposite side is covered by insulation.

3 Claims, 5 Drawing Figures

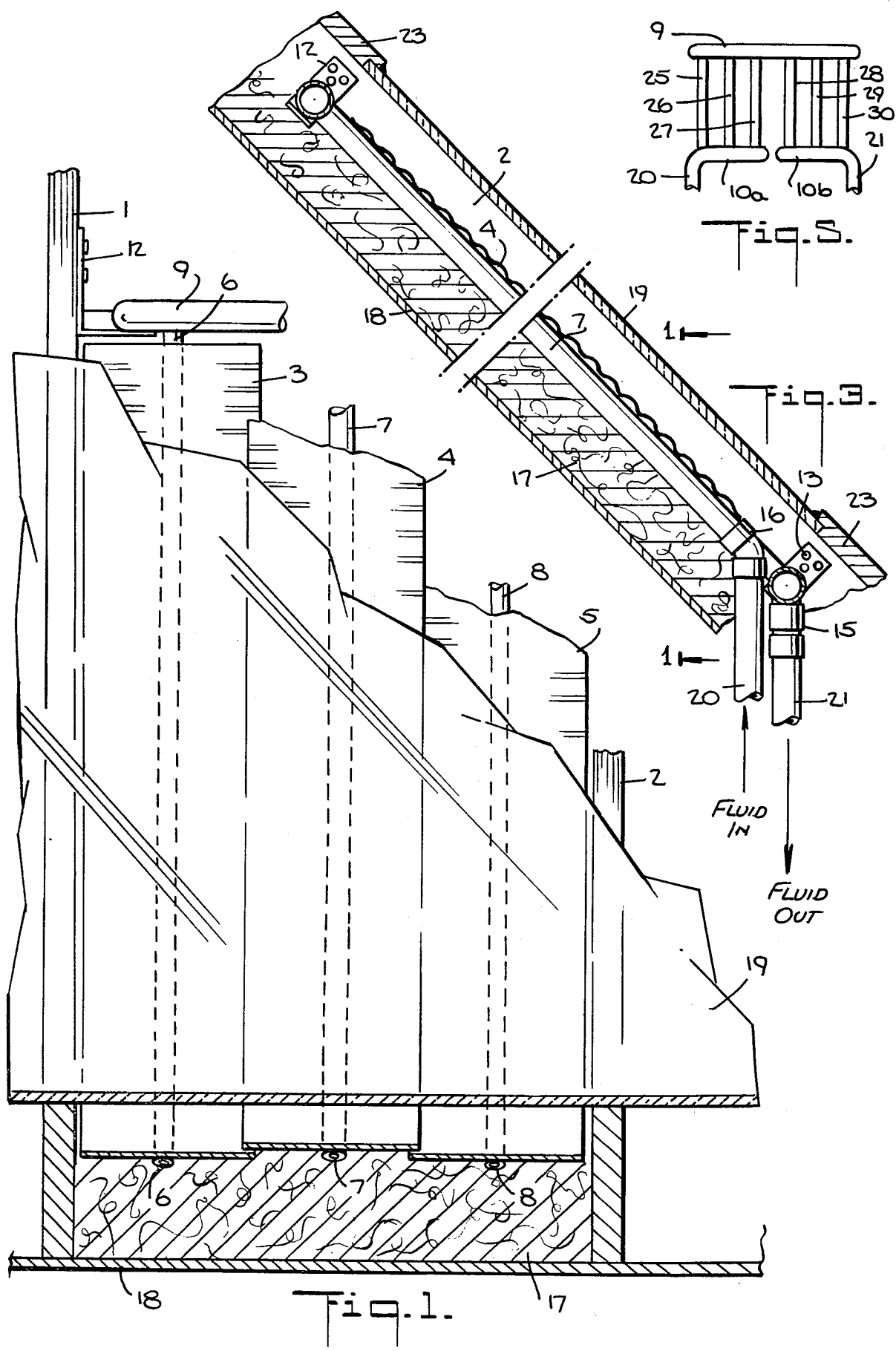

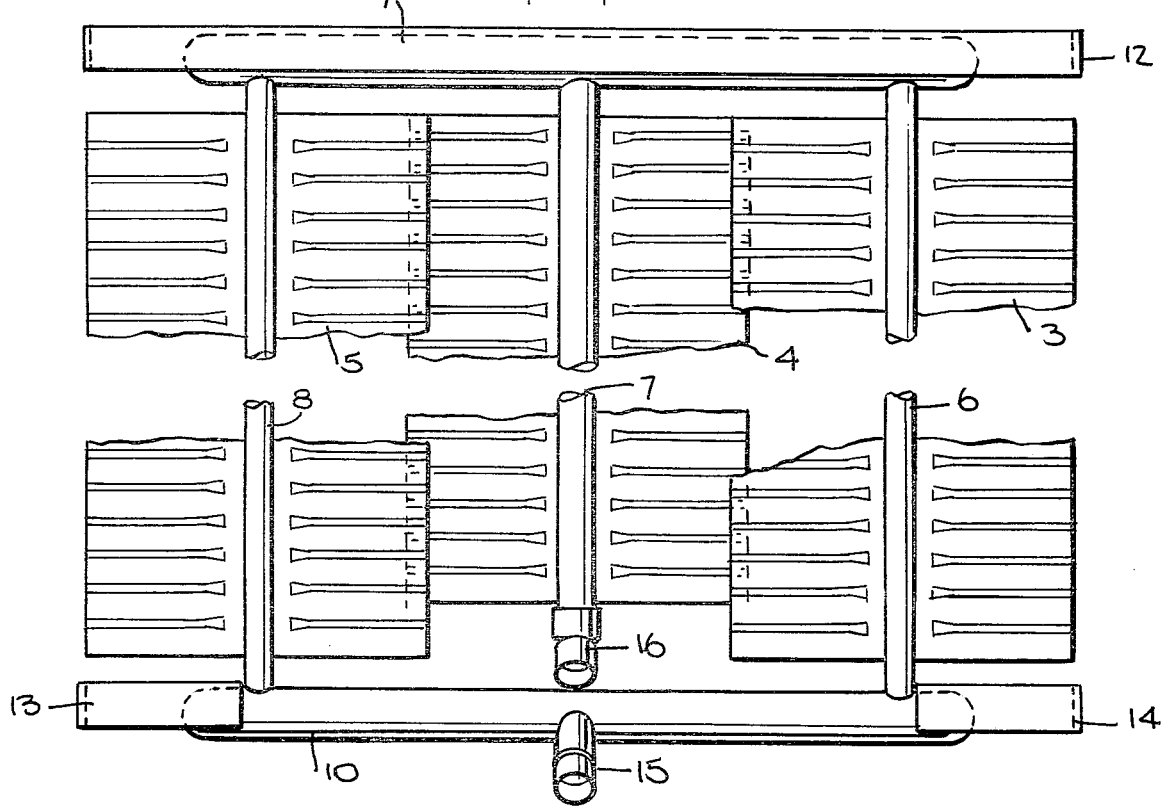
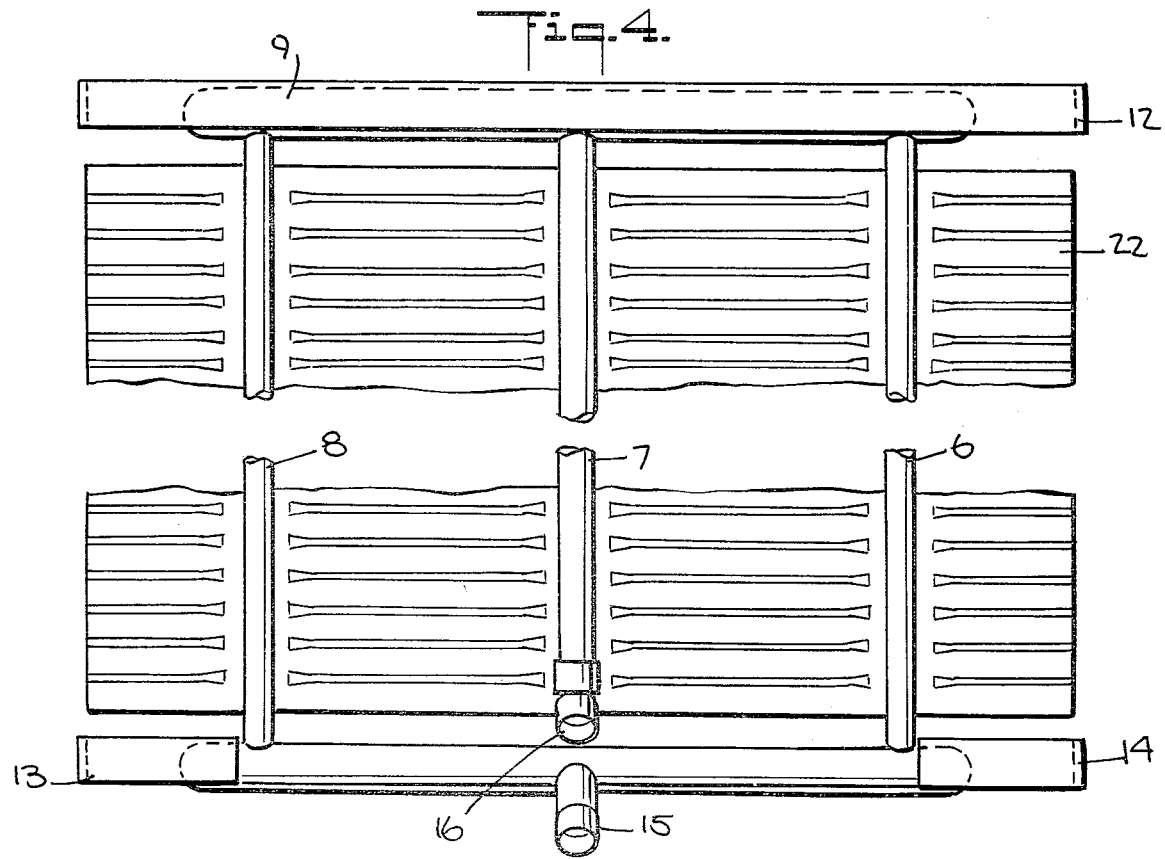

SOLAR COLLECTOR UNIT FOR ROOF OR WALL MOUNTING

This invention relates to solar collector units especially adapted for mounting between structural elements, such as the studs or rafters, of a structure, such as a building.

A significant portion of the manufacturing cost of solar collector units available in the past has been the supporting structure and the insulation for the backs and sides of the units. If the units can be installed as part of the building, the conventional structural elements of the building used for other purposes can also be used to support one or more solar collector units, and the normal building insulation installed at the site can be used to insulate the units. In this way, the cost of the units can be reduced.

On the other hand, much of the cost savings can be lost if special building designs are required or if the installation of the units requires high cost labor for custom installation of the units at the site.

One object of the invention is to provide a fully prefabricated solar collector unit which can be easily and inexpensively installed between conventional, load bearing structural elements of a building without the need for skilled labor at the site.

Another object of the invention is to provide a solar collector unit building installation in which a unit comprising a solar collector strip or panel or solar collector strips with fluid conveying tubes secured thereto and comprising headers secured to the tubes is mounted between structural elements of a building which support the unit. The front of the unit which faces the sun is covered by solar energy transmitting glazing secured to the building, and the back, and if desired, the sides of the unit are insulated by insulation installed at the site.

In the preferred embodiment of the invention, the solar collector unit comprises a plurality of thin, corrugated metal strips mounted in side-by-side relation, preferably with slightly overlapping edge portions. Each of two of the strips at opposite sides of a third strip has a tube of a first bore size welded thereto and the third, intermediate strip has a third tube of a second, larger bore size welded thereto. Preferably, the cross-sectional area of the larger bore of the third tube is equal or greater than the sum of the cross-sectional areas of the bores of the other two tubes, the third tube being the input conduit for the fluid flowing in the other two return tubes. Headers at opposite ends of the two tubes are connected thereto for fluid flow, and the third tube is connected at one end to one header and is not connected at its opposite end to the other header. Thus, connections for the fluid source, both supply and return, may be made at one end of the collector unit.

Other objects and advantages of the present invention will be apparent from the following detailed description of the presently preferred embodiments thereof, which description should be considered in conjunction with the accompanying drawings in which:

FIG. 1 is a partially cut-away, plan view, partly in cross-section, of a solar collector unit installation of the invention, the cross section being taken along the line 1—1 of FIG. 3;

FIG. 2 is an enlarged bottom view of the collector unit shown in FIG. 1;

FIG. 3 is a side elevation view, partly in section, of the collector unit installation shown in FIG. 1;

FIG. 4 is a bottom view of an alternative embodiment of a collector unit in which the separate metal strips are replaced by a single metal strip or panel; and FIG. 5 is a diagrammatic illustration of a collector unit with more than three tubes.

The invention will be described as though it is to be installed between a pair of roof rafters which support an exterior covering, but it will be apparent that the collector unit of the invention may be installed in other places, such as between a pair of studs which support an exterior covering. Although the installation of only one collector unit will be described, it will also be apparent that several collector units, connected to a single fluid source, may be similarly installed.

In FIG. 1, the numerals 1 and 2 designate a pair of spaced rafters of a sloping roof. Conventionally, such rafters 1 and 2 are spaced sixteen inches or twenty-four inches apart from center to center. Thus, the space between the rafters 1 and 2 is respectively approximately fourteen and one-half inches and twenty-two and one-half inches.

The collector unit shown in FIGS. 1, 2 and 3 comprises three thin strips 3, 4 and 5 made of a metal, such as copper or aluminum. Preferably, the strips 3–5 are corrugated as described in U.S. Pat. No. 4,326,583 and are welded to tubes 6, 7 and 8, respectively, as described in said patent. Preferably, the surfaces of the strips 3–5 facing the sun are coated or treated in a conventional manner, such as by painting them black or by providing a black chrome layer thereon, to increase energy absorption.

Preferably, the tubes 6–8 are brazed at end to a header 9, and the tubes 6 and 8 are brazed at their opposite ends to a header 10. However, the tubes 6 and 8 may be connected to the headers 9 and 10 and the tube 7 may be connected to the header 9 in any other known way which will provide the mechanical strength which will permit the unit to be transported from the place of manufacture to the installation site. Mounting brackets 13 and 14 are secured to the ends of the header 10 in any conventional manner, such as by brazing or welding.

Preferably, a nipple 15 is secured to the header 10 and an elbow 16, e.g. a 45° elbow, is secured to the lower end of the tube 7 for providing connections to a conventional fluid source which circulates fluid through the tubes 6–8 and the headers 9 and 10.

Since the tube 7 must carry the fluid flowing in the two tubes 6 and 8 and since it should do so without significantly restricting such flow the cross-sectional area of the bore of the tube 7 preferably is substantially equal to the sum of the cross-sectional areas of the bores of the tubes 6 and 8. For example, the tubes 6 and 8 may have an outside diameter of three-eighths of an inch and the tube 7 may have an outside diameter of one-half inch.

Accordingly, the prefabricated solar collecting unit of the invention is a transportable unit which may be shipped to a site for mechanical installation by unskilled labor. To install the unit, it is placed between the rafters 1 and 2 and secured to the rafters 1 and 2 by means of the brackets 13 and 14 with the upper surfaces of the strips 3–5 below the upper surfaces of the rafters 1 and 2. The far end, i.e. header 9, must be free to move parallel to the rafters in response to thermal expansion of the unit, but it may be supported by a transverse strip 12 secured to and extending between rafters 1 and 2. Other intermediate transverse strips may be necessary to provide adequate support to the collector. The upper surfaces of the rafters 1 and 2 may be painted black to render them less obvious.

The width of the collector unit, i.e. the distance between the outer edges of the strips 3 and 5, is selected so as to be less than the distance between the facing faces of the rafters 1 and 2. For example, such width may be thirteen inches when the rafters are spaced fourteen and one-half inches between adjacent faces and may be twenty-one inches when the rafters are spaced twenty-two and one-half inches between adjacent faces. The length of the collector unit, i.e. the distance between the outer edges of the brackets 11 and 13 and the brackets 12 and 14, may be any desired length which will fit within the free space between the rafters 1 and 2, and preferably, is of the order of six to ten feet.

The space between the inner faces of the rafters 1 and 2 and between the back or bottom faces of the strips 3–5 and the lower or inner surfaces of the rafters 1 and 2 is filled with insulation 17. This insulation must be capable of withstanding the high temperatures (250° F. to 350° F.) that can result under high insulation with no fluid in the tubes. The insulation 17 may be covered with a rigid material on the inside of the roof, such as plywood or wallboard 18 secured to the rafters 1 and 2.

Also, after the collector unit is installed, the face thereof is covered with sun energy transparent glazing 19 which is sealed in a conventional, weatherproof manner to the surrounding roof surface 23.

It will be observed that the fluid connections to the collector unit are at the same end (see FIG. 3), and at any time after the unit is mounted on the rafters 1 and 2, i.e. before or after the insulation 17 and the glazing 19 are installed, the nipple 15 and the elbow 16 may be connected by pipes 20 and 21 to the source of fluid to be circulated in the tubes 6–8 for heat exchange purposes. The pipes 20 and 21 may, for example, extend to the building basement and between the inner and outer walls of the building. The fluid may flow into the tube 7 by way of the pipe 20 and be removed from the header 10 by way of the pipe 21 or may be supplied to the header 10 by way of the pipe 21 and removed from the tube 7 by way of the pipe 20.

In the embodiment described, three strips 3–5 have been employed. Of course, a greater or lesser number of tubes and strips may be used in the collector unit. When a greater number of tubes is used, the ends of the tubes at one end of the unit may all be connected to a single header, and the ends of the tubes at the opposite may be connected in two groups to two headers as illustrated diagrammatically in FIG. 5, FIG. 5 illustrating a plurality of tubes 25–30 and three headers 9, 10a and 10b. With the embodiment in FIG. 5, all the tubes 25–30 may have the same bore size.

Also, as illustrated in FIG. 4, the same number of tubes 6–8 may be used with a single wide strip or panel 22 of metal which is welded or otherwise secured, to the tubes 6–8. Except for the replacement of the strips 3–5 by a single strip or panel 22, the embodiment shown in FIG. 4 is the same as, and is installed in the same way as, the embodiment described in connection with FIGS. 1–3.

Although preferred embodiments of the present invention have been described and illustrated, it will be apparent to those skilled in the art that various modifications may be made without departing from the principles of the invention.

I claim:

1. A solar collector unit installation on a building having an exterior covering supported by spaced structural elements interiorly of said covering, said installation comprising:

a solar collector unit mounted between, and secured to, said elements interiorly of said covering, said unit comprising three separate metal strips in side-by-side relation and three tubes, each tube being secured in heat conducting relation to a different one of said strips and being in spaced relation to the other tubes to provide one tube intermediate and spaced from the other two tubes and the combined width of said strips being less than but substantially equal to the spacing between said elements and said unit comprising a pair of headers, one of said headers being disposed at one end of said unit and the other of said headers being disposed at the other end of said unit, the intermediate tube being connected at one end to said one header for fluid flow therebetween and being free of fluid flow connection at its other end to said other header and one end of each of the other tubes being connected to said one header for fluid flow therebetween and the other end of each of the other tubes being connected to said other header for fluid flow therebetween, said intermediate tube having a bore of a cross-sectional area which is at least substantially equal to the sum of the cross-sectional areas of the bores of the other tubes;

said exterior covering having a sun energy transparent portion exteriorly of said strip to permit sun energy to strike said strip;

insulation material filling the space between said elements which is interiorly of said unit; and means for connecting said other header and said other end of said intermediate tube to a fluid source for circulating a fluid through said tubes and said headers.

2. A solar collector unit for mounting between spaced structural elements of a building, said unit comprising:

at least three separate metal strips in side-by-side relation having a combined width less than but substantially equal to the spacing between said elements;

at least three tubes, each tube being secured in heat conducting relation to a surface of a different one of said strips and being in spaced relation to each other to provide one tube intermediate and spaced from other tubes and said one tube having a bore of a cross-sectional area at least substantially equal to the sum of the cross-sectional areas of the bores of the others of said tubes;

a first header disposed at one end of said strips and connected to the ends of each of said tubes at said one end of said strip for interconnecting said tubes for fluid flow therebetween;

a second header disposed at the other end of said strips and connected to the ends of said tubes at said other end of said strips other than the end of said one tube at said other end of said strip for interconnecting said tubes other than said one tube for fluid flow therebetween, the other end of said one tube being disposed adjacent said second header and being free of fluid flow connection with said second header; and means on said second header for connecting said second header to a fluid source for fluid flow between said source and said second header.

3. A solar collector unit as set forth in claim 2 wherein said strips are disposed with overlapping edge portions which have widths which are small relative to the widths of the strips.

* * * * *